Figure 1A:
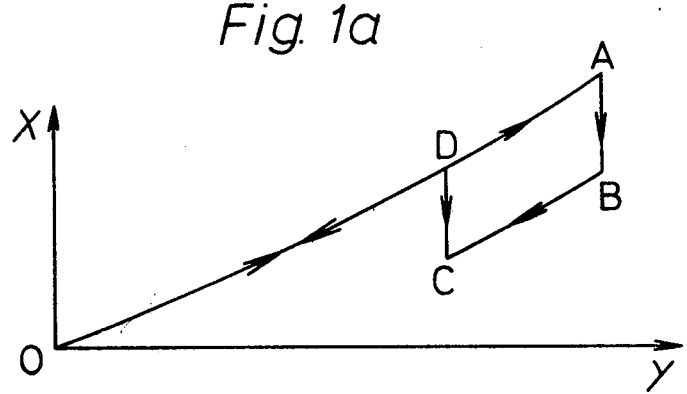

United States Patent [19]

Bottrill et al.

[11] 4,123,013
[45] Oct. 31, 1978

[54] SAFETY BELT REWINDING MECHANISM WITH IMPROVED RETRACTION CHARACTERISTICS

[75] Inventors: John Bottrill, Chichester; Douglas J. Cunningham, Steep Marsh Nr. Petersfield, both of England

[73] Assignee: Britax (Wingard) Limited, Chichester, England

[21] Appl. No.: 755,095

[22] Filed: Dec. 28, 1976

[30] Foreign Application Priority Data

Jan. 7, 1976 [GB] United Kingdom ............... 490/76

[51] Int. Cl.$^2$ ..................... A62B 35/02; B65H 75/48
[52] U.S. Cl. ............................. 242/107; 242/107.4 R
[58] Field of Search ......................... 242/107–107.7; 280/744–747; 180/82 C; 297/388; 185/9–14, 37, 39

[56] References Cited

U.S. PATENT DOCUMENTS

| | | | |
|---|---|---|---|
| 3,957,222 | 5/1976 | Bladh | 242/107.4 R X |
| 3,957,283 | 5/1976 | Pocobello | 242/107.4 R X |
| 3,984,063 | 10/1976 | Knieriemen | 242/107 |
| 3,997,126 | 12/1976 | Karlsson | 242/107 |

*Primary Examiner*—Harvey C. Hornsby
*Assistant Examiner*—John M. Jillions
*Attorney, Agent, or Firm*—J. Rodman Steele, Jr.

[57] ABSTRACT

Safety belt retractors are disclosed in the form of spring driven belt rewinding mechanisms. In some arrangements, a pair of spiral springs act in series or in parallel, one spring applying a constant rewinding torque to a belt storage shaft, the other storing energy when the belt is withdrawn. A ratchet maintains the stored energy and is disengaged by a screw threaded actuator, which moves coaxially to the storage shaft, when the shaft rotates through a number of revolutions. The stored energy is released to supplement the rewinding torque of the first spring. In another arrangement, the ratchet is replaced by an over center spring assembly. An epicyclic gear box drives a coil spring anchorage through a given arc to give an over center action.

16 Claims, 4 Drawing Figures

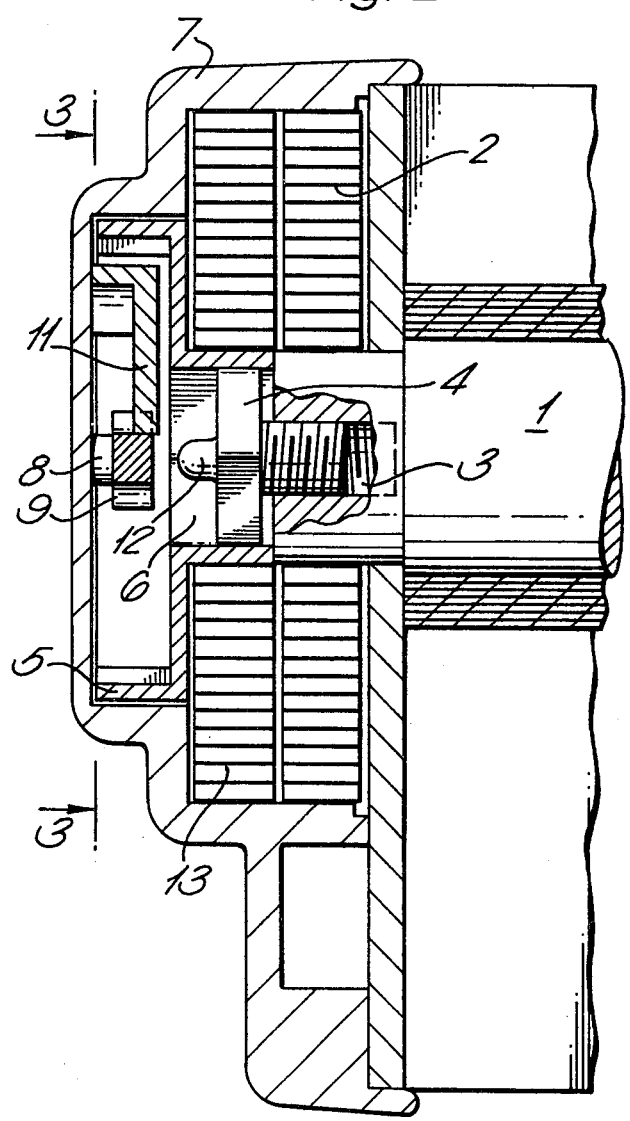

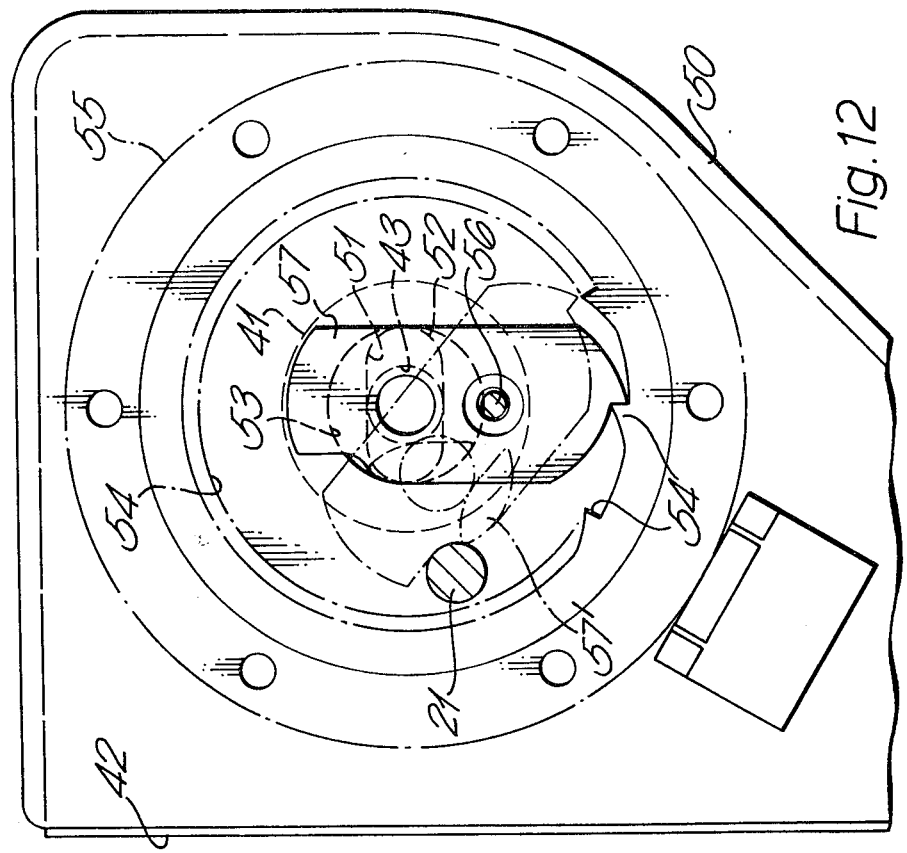
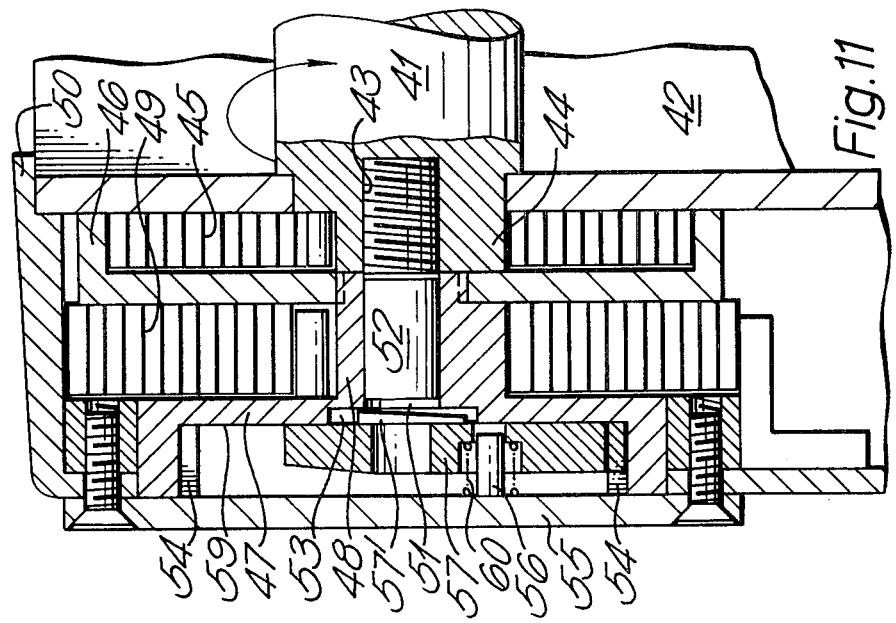
Fig.12
Fig.11

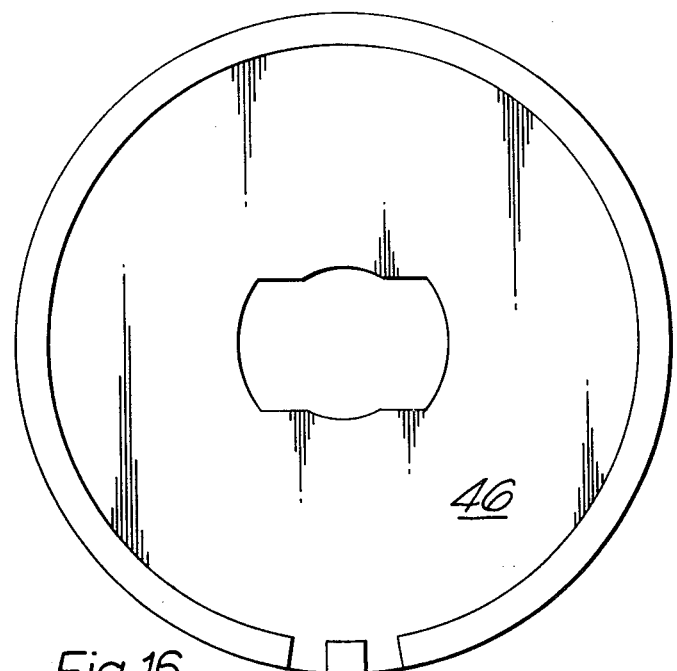
Fig. 16
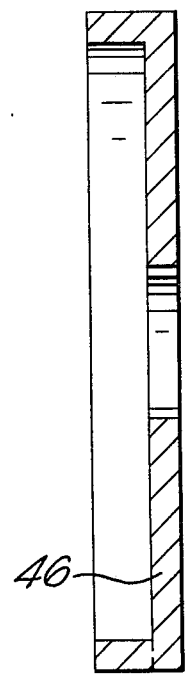
Fig. 17
Fig. 20
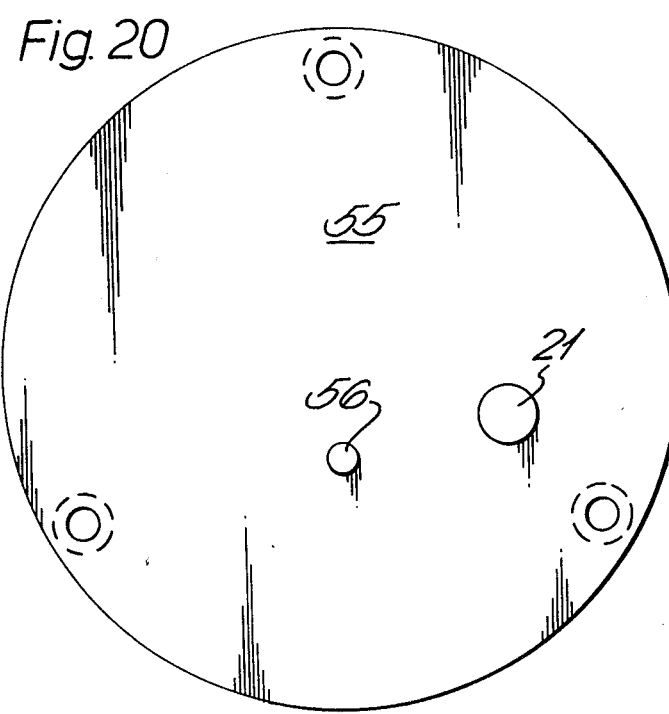
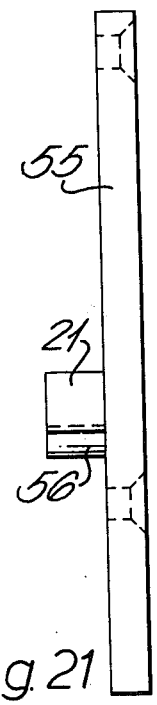
Fig. 21

SAFETY BELT REWINDING MECHANISM WITH IMPROVED RETRACTION CHARACTERISTICS

This invention relates to safety belt rewinding mechanisms fitted with a belt storage reel and, more particularly, to improvements in the belt retraction characteristics of such a rewinding mechanism.

In a safety belt rewinding mechanism fitted with a belt retractor, such as a coil spring which is wound up when the belt is withdrawn from a storage reel, a near maximum tension is exerted when the belt is worn by the user. When the belt is disconnected and released, the retractor withdraws the belt onto the reel but the tension decreases as the belt is rewound which prevents efficient stowage. Such known characteristics of belt retraction are the reverse of what is ideally required in practice namely, a low tension when the belt is worn and a high tension to rewind the belt rapidly and positively when it is released for stowage.

The present invention is directed to the problem of reducing the retraction force on a safety belt when worn (to improve comfort) and to increase the retraction force after the belt has been released (to ensure positive and complete retraction). Kneiriemen in U.S. Pat. No. 3,984,063 offers one solution to this problem. Knieriemen discloses a retractor which employs a primary spring and an assist spring which both act on the reel for fully retracting the belt, a lock lever being moved between first and second positions, when the belt is withdrawn, to maintain the assist spring in a wound up state so that it does not exert any torque on the reel. Movement of the lock lever is effected by means of a prominence on a cam track, the cam being driven by gearing directly from the reel spindle. However, such an arrangement has the disadvantage that the assist spring is locked out at precisely the same point each time the belt is withdrawn from the reel, for example, after a predetermined number of turns as the belt is pulled out. Thus, if the lock out position is suitable for a user with a small torso, it will be unsuitable for a user with a large torso when the belt must be further withdrawn before fastening. Likewise, the lock out position will change, as far as the user is concerned, if the position of the vehicle seat is adjusted.

The present invention seeks to overcome the latter mentioned problem and to provide a further improvement in that release of the locked out spring may occur after several turns of the reel when released for stowage. The invention employs ratchet and pawl means which enable both the main and auxiliary spring to be wound as the belt is withdrawn from the reel, the pawl engaging the ratchet to lock out the main spring only after the belt has been released and has been slightly retracted by the reel. Thus, it makes no difference if the wearer has a small or large torso or if the wearer adjusts the position of a vehicle seat. The lock out will only occur after the belt has been released and is not solely dependent on a predetermined number of turns of the reel. To provide additional comfort and convenience, the pawl is released by an actuator which is coupled by counting means, such as a screw threaded coupling, to the safety belt reel. This enables a plurality of revolutions of the reel before the actuator causes disengagement between the ratchet and pawl thereby bringing in the main spring to assist the auxiliary spring in fully retracting the belt. This is a decided advantage in that movement of the occupant beyond a certain limit does not cause the main spring to be released and hence exert its extra torque on the reel whilst the belt is being worn. The plurality of turns is such that any movement of the wearer will not cause the main spring to be released.

It is therefore an object of the invention to provide an improvement in a safety belt retractor having a main spring and an auxiliary spring for retracting the belt on a reel, the main spring being locked out to relieve the tension on the belt when worn, by enabling the lock out position to occur at any point after belt release.

It is a further related object to provide an improvement is such a reel whereby the locked out main spring is released only after a plurality of turns of the reel.

Other features and objects of the invention will become apparent from the following description taken in conjunction with the accompanying drawings.

Figure 1B:
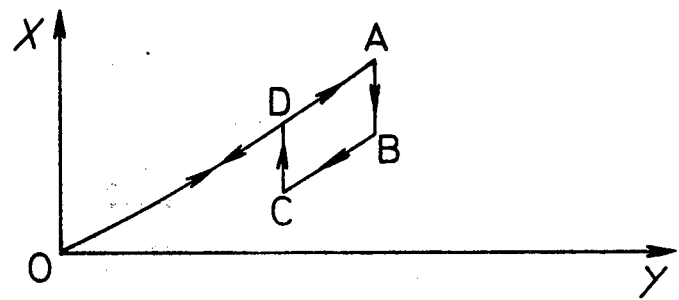
Figure 3:
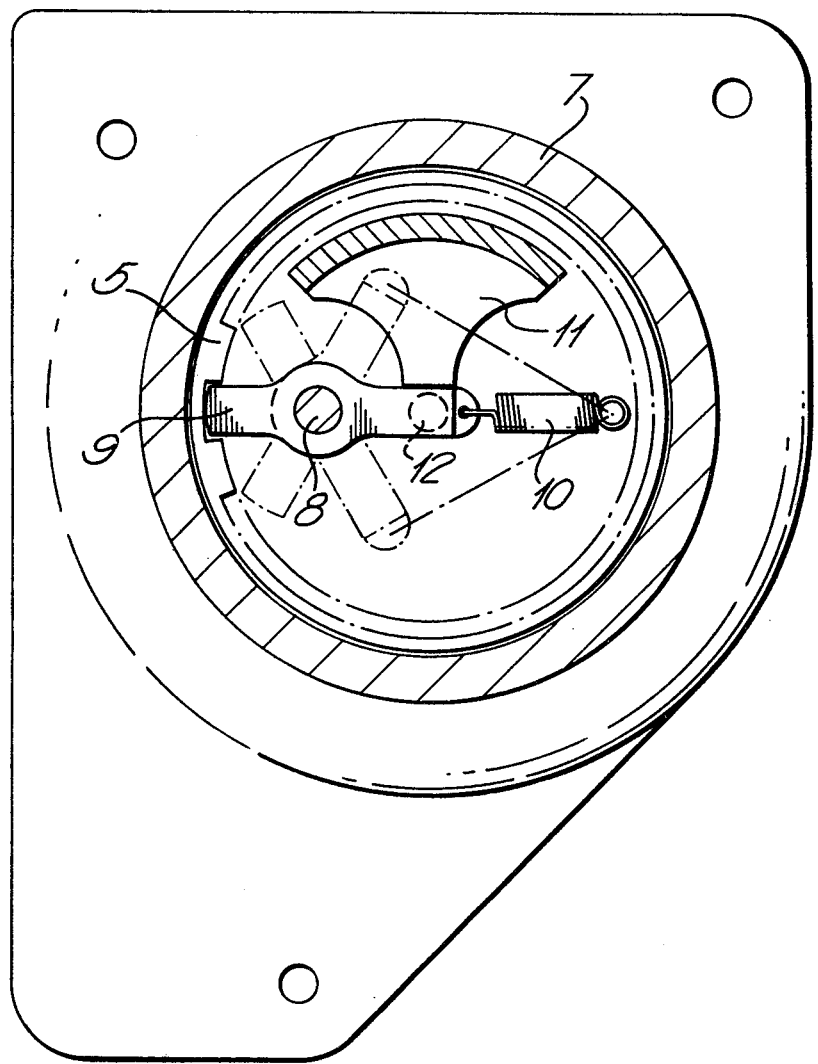
Figure 4:
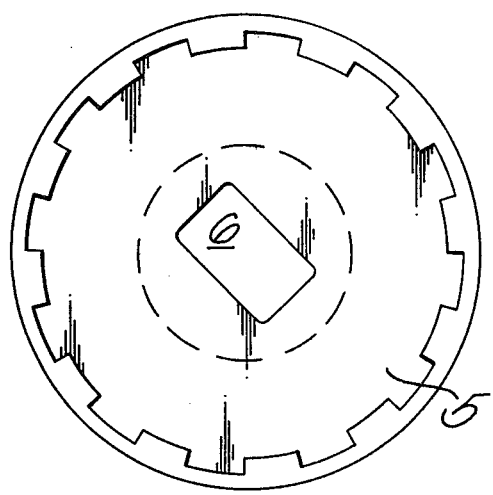
Figure 5:
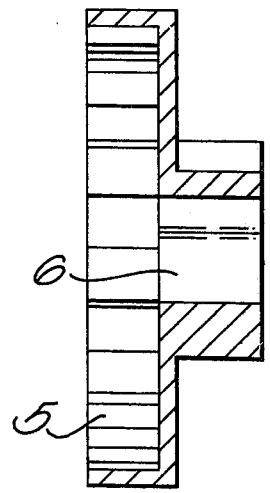
Figure 6:
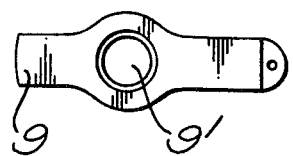
Figure 7:
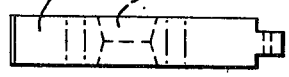
Figure 8:
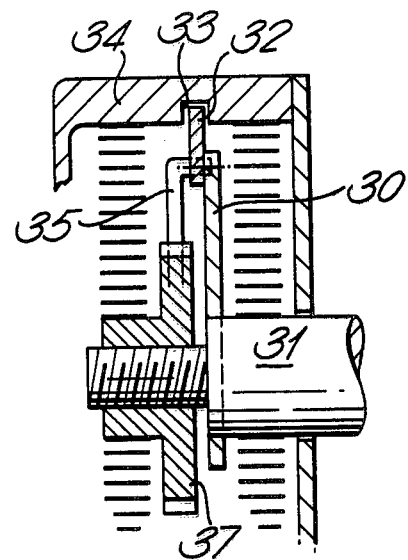
Figure 9:
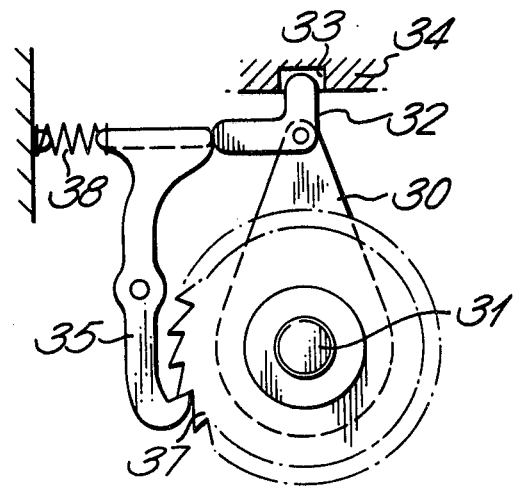
Figure 10:
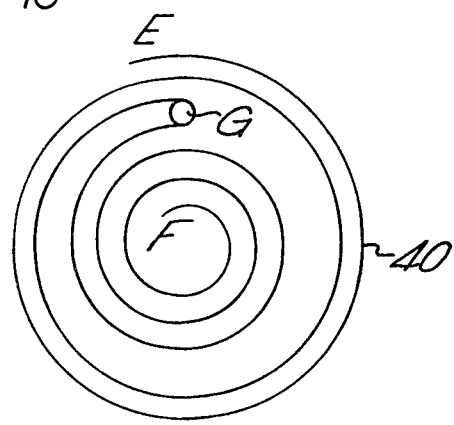
Figure 18:
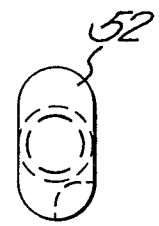
Figure 19:
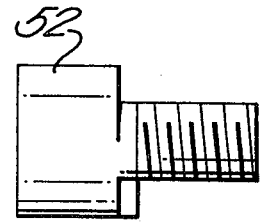
Figure 14:
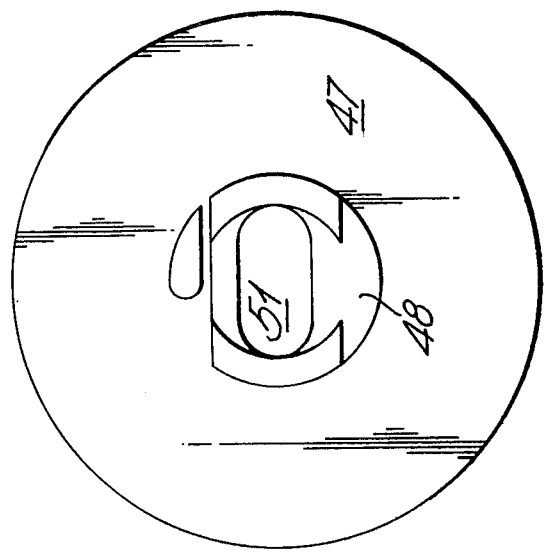
Figure 13:
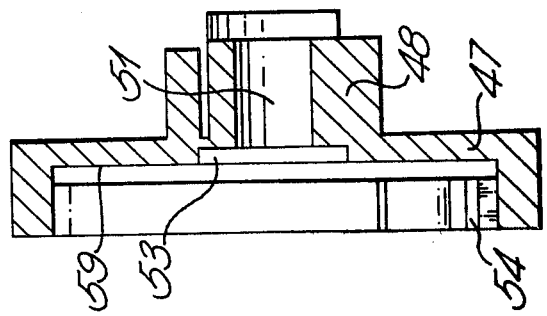
Figure 15:
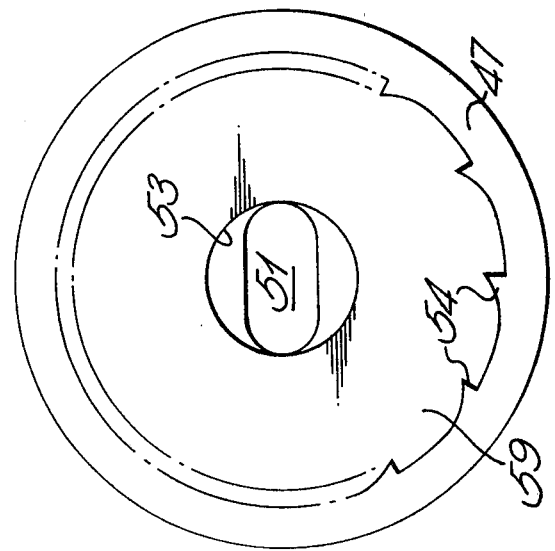
Figure 22:
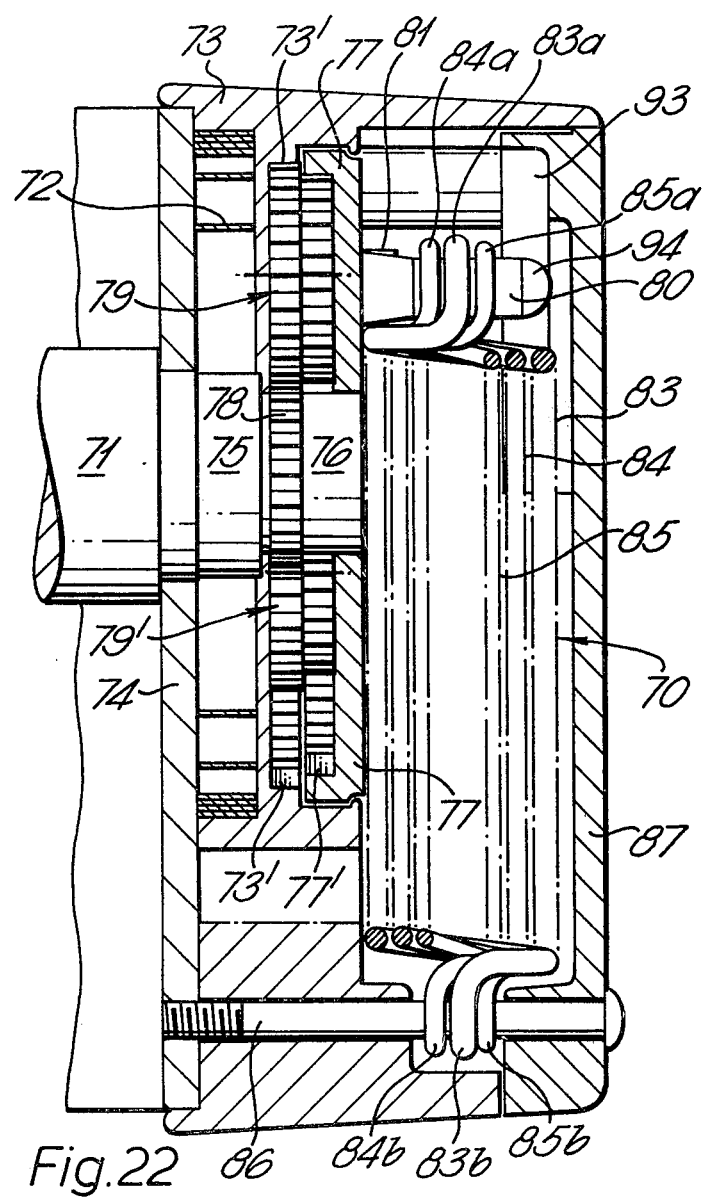
Figure 23:
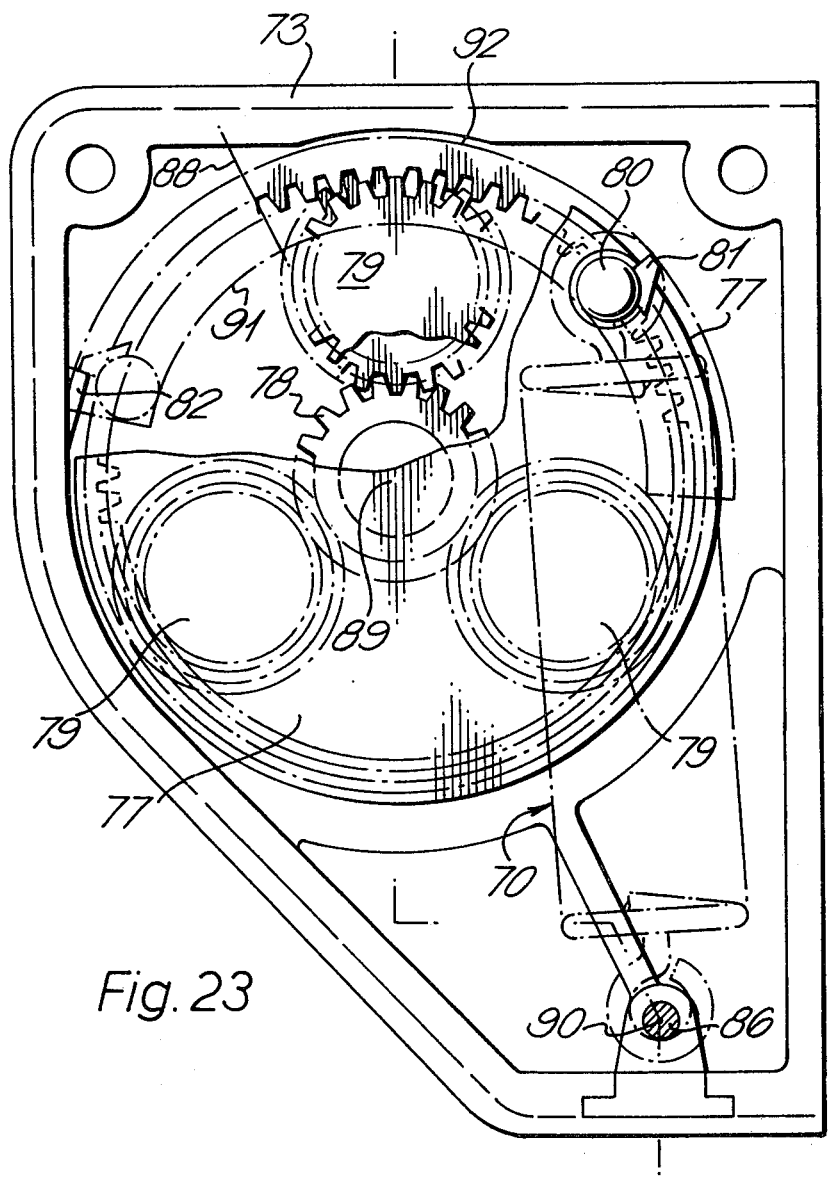

Preferred embodiments of the invention will now be described with reference to the accompanying drawings, in which:

FIGS. 1(a) and 1(b) are graphs illustrating preferred belt characteristics,

FIG. 2 is a sectional elevational view of a belt rewinding mechanism according to a first embodiment, FIG. 3 is a section on line 3—3 of the mechanism, FIGS. 4 and 5 are end on and sectional elevational views of a ratchet wheel used in the embodiments of FIGS. 2 and 3, FIGS. 6 and 7 are plan and elevational views of a pawl used in the mechanism of FIGS. 2-5, FIG. 8 is a sectional elevational view of a rewinding mechanism according to another embodiment, FIG. 9 is an end on view of the operative parts of the mechanism shown in FIG. 8, FIG. 10 schematically illustrates a special spring used in another embodiment, FIG. 11 is a sectional side elevation of another safety belt rewinding mechanism, FIG. 12 is an end elevation, with an end cover removed, of the mechanism of FIG. 11, FIGS. 13, 14 and 15 are respectively sectional, inner side and outer views of a ratchet member used in the mechanism of FIG. 11, FIGS. 16 and 17 are respectively side and elevational views of a driving member of the mechanism of FIG. 11, FIGS. 18 and 19 are respectively end-on and side views of a pawl control member of the mechanism of FIG. 11, FIGS. 20 and 21 are respectively side and elevational views of an end cover of the mechanism of FIG. 11, and FIGS. 22 and 23 are respectively sectional and elevational views of another safety belt rewinding mechanism.

FIGS. 1(a) and 1(b) illustrate preferred belt retraction characteristics in which the load X or retraction force is plotted against belt extension Y. FIG. 1(a) shows the characteristics when a large person wears the belt. The belt is first withdrawn to point A and the buckle is fastened. As the slack in the belt is taken up by the reel the load or retraction drops to point B and may decrease a little further partly along the line BC. When the belt is subsequently released for stowage, it is retracted along line BC, but when the point C is reached, the retracting force suddenly increases to point D. Further retraction takes place along the line DO.

FIG. 1(b) shows similar characteristics when the belt is worn by a small person. In this case, the sudden changes in load or retraction force take place at a lower extension level but the mode of operation is the same.

The area enclosed by A B C D represent stored work and the work is released back into the system at point C. Although not shown in the graphs, in practical systems that are envisaged, this work may be felt as a snatch suddenly pulling the belt back towards the reel.

In a first embodiment of the invention, illustrated by FIGS. 2-7 a shaft or reel spindle 1 is directly connected to a first coil spring 2. Spring 2 is always drivably coupled to the spindle 1 and the load/extension characteristic of spring 2 alone defines the line BC of FIGS. 1(a) and 1(b).

One end of spindle 1 has a tapped hole 3 which threadably engages an actuating member 4, which member is rectangular in section when viewed from the end of spindle 1. An internally toothed wheel 5, shown in FIGS. 3, 4 and 5, has a rectangular hole 6 just large enough to allow the actuating member 4 to be a sliding fit. Thus, rotation of member 4 causes rotation of the toothed wheel 5 but axial movement of member 4 does not cause a corresponding axial movement of wheel 5. Wheel 5 is directly connected to a second coil spring 13.

An end cover 7 of the reel carries an internal projection 8 on which a pawl 9 is pivoted. Pawl 9 is biased to a central position by means of a coil spring 10. As shown in FIG. 7, the pawl has a hole 9' which is enlarged at each end so that pawl 9 can rock as well as rotate about the axis of projection 8. In its central position, the tip of the pawl 9 engages a space between the teeth of wheel 5. The cover 7 also supports a pawl stop 11 which is cantilevered so as to leave a space between it and the cover. The pawl stop 11 normally stops anticlockwise rotation of the pawl as viewed in FIG. 3.

Acutating member 4 has, at its free end, a pip 12 aligned with the pawl 9 in its central position.

In operation, assuming that member 4 is fully screwed home in spindle 1 and that the belt is fully stowed on the spindle, as the belt is withdrawn, spring 2 is wound. The direction of rotation is such that any resistance to the rotation by member 4 causes member 4 to be more fully screwed into engagement with spindle 1, for example, it has a left-hand thread. Because member 4 is already fully home, it is forced to rotate with spindle 1 and the rectangular portion drives wheel 5 in the same direction.

To accommodate the motion, pawl 9 acts as a ratchet pawl and clicks over the teeth by rotating first in a clockwise direction, unitl it disengages from the toothed wheel 5, and then clicking back towards the central position as each tooth moves past it. Rotation of wheel 4 is resisted by spring 13 so that the total resistance to belt withdrawal is the sum of resistances of spring 2 and spring 13. This is represented by lines O D A in FIGS. 1(a) and 1(b).

When a sufficient length of the belt is withdrawn, a small amount is allowed to be rewound, but because of pawl stop 11, pawl 9 does not act as a ratchet in the reverse direction, so that wheel 5 and its associated spring 13 are drivably decoupled from the belt. Thus, only spring 2 retracts the belt and the force which is felt by the user is that shown by line BC in FIG. 1.

During the period that wheel 5 is stationary, actuating member 4 is also stationary and thus it is moved axially by the screw thread. Eventually pip 12 engages the pawl 9 and causes it to rock out of engagement with pawl stop 11. At this point, pawl 9 is allowed to act as a ratchet in the reverse direction so that the stored energy in spring 13 is released and wheel 5 rapidly catches up with spindle 1. When member 4 is screwed fully home, both springs 2 and 13 drive spindle 1 to provide the operating characteristics of line DO in FIGS. 1(a) and 1(b).

When the belt is next withdrawn, the pawl 9 engages a tooth of the wheel 5 and rotation of the wheel returns the pawl to the stop 11 (as shown in FIG. 3) ready for subsequent operation.

FIGS. 8 and 9 shows an alternative embodiment in which a plate 30 frictionally engages a spindle 31 and supports a pawl control lever 32 which engages a recess 33 in a reel casing 34. Pawl 35 is urged out of engagement with toothed wheel 37 by compression spring 38.

When the belt is withdrawn, wheel 37 is driven because it is fully bottomed on the threaded spindle 31. Plate 30 rotates clockwise until lever 32 engages the wall of recess 33 such that the lever 32 rotates anticlockwise out of the way of the pawl 35. Thus, pawl 35 is moved by its spring 38 out of engagement with wheel 37. When the direction of spindle 31 is reversed, plate 30 moves anti-clockwise, lever 32 moves clockwise and nudges pawl 35 into engagement with wheel 37. Further movement causes lever 32 to move past pawl 35 but, because of the hooked shape of the teeth on the pawl and the wheel, the pawl remains in engagement and prevents movement of wheel 37. With wheel 37 held against rotation, continued rotation of spindle 31 causes axial movement of the wheel in its groove thread until it eventually slides sideways out of engagement with pawl 35. Spring 38 then moves pawl 35 out of the way and the system restores itself to two spring operation.

In a further embodiment shown in FIG. 10 a single coil spring 40 provides first and second belt retraction drives. For example, section E acts as the first belt retraction means for applying a continuous tension to the belt (not shown) and section F acts as the second belt retraction means which can be temporarily decoupled from the belt, for example, by a disconnectible ratchet, as in the previous embodiments. The spring 40 is anchored to a fixed part of the belt rewinding mechanism at a point G which is intermediate the ends of sections E and F.

Referring to FIGS. 1(a) and 1(b), the stored energy enclosed by A B C D may be either returned to the belt as described in the above embodiments, or it may be discarded, for example, by releasing some of the tension in the respective coil spring or spring portion without supplementing the main belt drive.

In the embodiment of FIG. 11 a shaft or reel spindle 41 is mounted for rotation in a frame 42. The rewind mechanism is mounted to the left of the frame as shown. No inertia locking mechanism is shown, as this forms no part of the invention.

One end of spindle 41 has a threaded bore 43 and an extension 44 which has attached thereto the inner end of a spiral spring 45. The spiral spring 45 is a fairly light spring and is designed to allow only three to four turns between its unwound and its fully wound condition.

The outer end of spring 45 is attached to the inner wall of a drum forming part of a driving member 46. This member is shown in detail in FIGS. 16 and 17. The driving member 46 is keyed to ratchet member 47 shown in FIGS. 13, 14 and 15. The central boss of the ratchet member has attached thereto the inner end of a second spiral spring 49, which serves as a main reel rewind spring. The outer end of spring 49 is attached to a casing 50.

The central boss 48 of the ratchet member has an oval bore 51 into which slidably fits the head of a screw threaded pawl control member 52 — best seen in FIGS. 18 and 19. The screw threaded portion of the pawl control member is in threaded engaged in the threaded bore 43 of the spindle 41.

The ratchet member also has a shallow circular recess 53 at the outer end of the oval bore, and a row of inwardly facing ratchet teeth 54.

A mechanism end cover 55 carries a pivot pin 56 (see also FIG. 20) for a pawl 57 which is spring loaded,, by a spring 60, against the face of the ratchet member 47. The pawl 57 is a loose fit on pin 56 so that tilting of the pawl in directions into and out of the plane of the paper, as viewed in FIG. 12, is possible, as is normal pivoted movement about pin 56. The surface of the pawl which faces the ratchet member 47 has a small protruding portion 57' which is received in the recess 53 in the member 47. The protruding portion 57' is positioned on the pawl 57 such that it can engage the walls of recess 53 to limit the angular travel of the pawl. In FIG. 12 the pawl is shown at its extreme position in the anti-clockwise direction, but the pawl is free to pivot in a clockwise direction about pin 56 until its tooth disengages from the ratchet ring 54, further movement being prevented by the engagement of the protruding portion 57' engaging the wall of recess 53.

When the protruding portion 57' is in the recess 53, the rear surface of the pawl 57 is flat against the face 59 of the ratchet member 47 and because of the spring bias of spring 60, a certain amount of friction exists between the two surfaces.

Operation of the mechanism will now be described:

Assume first that the belt is fully wound on the reel and that to unroll the belt the spindle 41 is to be rotated in the direction indicated by the arrows of FIGS. 11 and 12.

One initial rotation to unreel the belt, spring 45 is wound up until it approaches the coil bound condition. Further winding causes driving member 46 to rotate which in turn starts to wind up mainspring 49. As spring 49 is wound, the ratchet member 47 also rotates with driving member 46 and because of the friction between the ratchet member 46 and the pawl 57, the pawl rotates from the position shown in FIG. 12 in a clockwise direction about its pivot to a new position such that its tooth disengages from the ratchet teeth 54. Further pawl rotation is prevented by the engagement of its protruding portion with the wall of recess 53 in the ratchet member. Because the pawl tooth is held out of engagement with the teeth 54 by friction there is no clicking sound normally associated with ratchets, and the ratchet member 47 rotates until the desired amount of webbing is unreeled.

Assume now that the belt is buckled and that a small amount of webbing is to be reeled in after the buckling operation. Upon initial rewind by the main spring, the pawl is carried by friction to the position shown in FIG. 12, at which point further anti-clockwise direction of the movement of the pawl is prevented by engagement of its protruding portion with the wall of recess 53.

Because the pawl is now engaged with teeth 54, further anti-clockwise motion of the ratchet member 47 is also prevented, so that spring 49 is effectively locked out of the rewind system. Retraction of the webbing can now only take place by virtue of the energy stored in light spring 45, and in this condition the belt is very comfortable to wear.

When the belt is to be stowed, light spring 45 continues to wind webbing until its energy is almost exhausted (after about 2 or 3 turns of spindle 41), but during this rotation the ratchet member 47 is fixed against rotation as is the pawl control member 52. However, because the pawl control member 52 is in screw threaded engagement to spindle 41 the relative rotation of the spindle and the pawl control member cause it to move to the left (as seen in FIG. 11). As the pawl control 52 moves to the left it engages the protruding portion of the pawl 57 and pushes it out of recess 53.

When the pawl is freed from the restraint imposed by the wall of recess 53, the main spring is able to rotate the ratchet member 47 and the pawl anti-clockwise until the pawl disengages from the teeth 54. The pawl is driven anti-clockwise until it engages stop 21. The energy stored in spring 49 is now released and the ratchet member 47 rotates rapidly until pawl control member 52 is screwed fully home in spindle 41, at this point the main spring acts to rewind the belt rapidly. Before the pawl control member 52 is screwed fully home, some of the energy of main spring 49 is used to rewind the small spring 45, and this cushions the impact of the pawl control member homing in the spindle 41.

The mechanism described above may be modified so that the light spring 45 is of a smaller diameter than that of the inner coil of the mainspring 49, whereby it can be located inside the mainspring 49. In other respects the mechanism is essentially the same. The advantage of this modification is that the overall width of the reel is reduced, helping installation in vehicles. When one spring is packed inside the other, it is possible to make one of the springs merely an extension of the other, but with some provision for taking the ratchet drive off from an intermediate coil of the spring; the ratchet member could be attached to the spring securely, or for example, by merely putting a kink into the spring at a point where it passes through the ratchet member.

It is also envisaged that a positive connection to the intermediate coil may be completely unnecessary, and that the friction forces operating between the spring and the ratchet member will allow satisfactory operation; in such a design, the spring would merely pass through a slot from the inner side to the outer side of the ratchet member.

The disengageable ratched used in the embodiments described above is dispensed with in the arrangement shown in FIGS. 22 and 23. In the latter arrangement, a spring assembly 70 is connected to a device for providing an over centre action such that clockwise or anti-clockwise torques are applied to a belt storage shaft 71. A spiral spring 72 is normally coupled between shaft 71. Thus, the resultant torque on shaft 71 is the algebraic sum of the torques exerted by springs 70 and 72. As the belt is initially withdrawn, the resultant torque is equal to the torque exerted by spring 70 plus the torque exerted by spring 72. This condition prevails until the over centre point is reached and, beyond this point, the resultant torque is that exerted by spring 72 minus that exerted by spring 70. The additive torques ensure positive belt retraction when the belt is released for stowage. The over centre point is selected with regard to the type of belt used and the size of the user's body. The differential torque is such as to ensure comfort with safe operation.

Referring in greater detail to FIGS. 22 and 23, the shaft 71 is rotatably supported between end plates 74 (only one of which is shown), the end of the shaft shown in FIG. 22 having two stepped sections 75, 76. The inner end of spiral spring 72 is fixed to the stepped portion 75 and the outer end is fixed to the casing 73.

The stepped section 76 supports a rotatable planet gear ring or carrier 77 having an inwardly facing ring of teeth 77'. The stepped section 76 is provided with a sun ring 78 which is fast with shaft 71. The sun ring 78 drives the rotatable planet ring 77 through each of three double planet gear wheels 79, the planet wheels of smaller diameter meshing with the rotatable planet ring 77 and the planet wheels of larger diameter meshing with a fixed sun ring formed by teeth 73' in a circular recess in casing 73. This arrangement forms an epicyclic gear box to step down the drive of shaft 71 with respect to the planet ring 77. For example, the gear ratio may be 30 turns on shaft 71 to 1 turn of ring 77, (in fact, the movement of ring 77 is limited to an arc as described below).

An anchorage member 80 is fixed to and projects from the planet ring 77. Member 80 has an abutment 81 and is caused to move in an arc between the position shown in FIG. 23 (where the safety belt, not shown, is fully wound on shaft 71) and a stop 82 (which is contacted by abutment 81 if the safety belt is fully withdrawn from shaft 71).

The spring assembly 70 is formed by three coaxial coil springs 83, 84, 85. One end 83a, 84a, 85a of each spring is anchored on member 80. The other end 83b, 84b, 85b of each spring is anchored on a fixed pin 86 passing through a cover 87, the casing 73 and the end plate 74. In operation, the shaft 71 rotates as the belt is withdrawn and this causes the anchorage member 80 to travel slowly along an arc. This arc is generally defined by a track indicated by dot and dash lines 91, 92 (FIG. 23). The track, which bounds recess 93 (FIG. 22), prevents horizontal displacement of the planet ring 77 because a rounded end 94 of member 80 abuts the face of the track 91, 92. Referring to FIG. 23, whilst member 80 moves between stop 81 and an over centre point 88 (lying on an axis passing through the centre 89 of sun ring 78 and the centre 90 of pin 86), the spring assembly 70 expands and acts to supplement the rewinding torque exerted by spring 72. The actual torque exerted by spring assembly 70 is reduced, due to the geometry of the system, as member 80 approaches the over centre point 88. When member 80 passes beyond the over centre point 88, the spring assembly 70 contracts so as to counteract the torque exerted by spring 72. The counteractive torque exerted by spring assembly 70 increases as member 80 moves away from the over centre point 88. This compensates for the increasing torque exerted by spring 72 as the belt is withdrawn from shaft 71. For example, when the belt is secured across the user's chest, the compensating effect allows the user to bend forwards without too much restriction being imposed by the tension in the belt.

What we claim is:

1. A safety belt retractor comprising: a safety belt; rotatable means for storing said belt; first and second means for biasing said rotatable means in a belt retracting direction, said first biasing means applying a light retraction force to said belt when worn, said first and second biasing means rewinding said belt on said rotatable means when said belt is not worn; lock-out means for disconnecting the bias of said second biasing means from said rotatable means, said lock-out means causing energy derived by pulling said belt from said rotatable means to be stored in said second biasing means, whereby only one said first biasing means applies the retraction force to said belt; actuator means for disengaging said lock-out means as said belt is retracted, to release said stored energy in said second biasing means; and, counter means, responsive to a predetermined plurality of revolutions of said rotatable means in the retraction direction, for moving said actuator means to a disengaging position, whereby said actuator means disengages said lock-out means after said plurality of revolutions whereby both said first and second biasing means rewind said belt.

2. The safety belt retractor of claim 1 wherein said rotatable means rotates about a longitudinal axis, said actuator means including a member which is axially displaceable by said counter means to disengage said lock-out means.

3. The safety belt retractor of claim 1 wherein said counter means comprises a threaded coupling between said actuator means and said rotatable means whereby said actuator means is moved to said disengaging position by said threaded coupling.

4. The safety belt retractor of claim 2 wherein said rotatable means comprises shaft means on which said belt is stored, and wherein said counter means comprises a threaded bore in said shaft means and means on said actuator means for threadably engaging said bore, whereby said actuator means is moved by the threaded engagement with said bore to said disengaging position.

5. The safety belt retractor of claim 4 wherein said lock out means comprises ratchet wheel means and co-operating pawl means, said ratchet wheel means being coupled to said second biasing means and said pawl means engaging said ratchet wheel means to lock out said second biasing means and said pawl means being disengaged from said ratchet wheel means by said actuator means, to disengage said lock-out means.

6. The safety belt retractor of claim 5 wherein said ratchet wheel means has radially inward directed teeth and said pawl means, at said one end of said shaft means, is disposed within the periphery of said radially inward directed teeth 7. The safety belt retractor of claim 6 wherein said pawl means is tiltably mounted for disengagement from said ratchet wheel teeth by said actuator means 8. The safety belt retractor of claim 7 including pawl stop means for abutting said tilting pawl means to enable engagement of said ratchet wheel means by said pawl means, said tilting pawl means being tilted by said actuator means, after said plurality of revolutions of said shaft means, out of engagement with said abutting means to disengage the pawl means from said ratchet wheel means.

9. The safety belt retractor of claim 8 further comprising a casing and wherein said first and second biasing means are respective first and second spirally wound springs mounted in said casing, said first spring having one end connected to said shaft means and its other end connected to said casing, said second spring having one end connected to said ratchet wheel means and its other end connected to said casing, said ratchet wheel means defining a drum within which said tilting pawl means and said pawl stop means are disposed, and said ratchet wheel means further defining a hollow stub, concentric with said drum, and having an aperture therethrough which receives a portion of said actuator means, said portion and said aperture being of a non-circular shaped whereby said actuator means is axially slideable relative to said stub but is fixed for rotation therewith.

10. A safety belt retractor, comprising: a safety belt; rotatable means for storing said belt; first and second means for biasing said rotatable means in a belt retraction direction, said first biasing means applying a light retraction force to said belt when worn, said first and second biasing means rewinding said belt on said storage means when said belt is not worn; ratchet means for disconnecting the bias of said second biasing means from said rotatable means, said ratchet means causing energy derived by pulling said belt from said rotatable means to be stored in said second biasing means, whereby only said first biasing means applies the retraction force to said belt, said ratchet means including a ratchet wheel and a pawl engageable with said ratchet wheel; and means for disengaging said pawl from said ratchet wheel as said belt is retracted to release said stored energy in said second biasing means, comprising a threaded engagement between said ratchet wheel and said rotatable means whereby said rotatable means rotates by a plurality of revolutions when said belt is released from retraction, before disengaging said pawl from said ratchet wheel.

11. A safety belt retractor of claim 10 wherein said rotatable means comprises shaft means and means mounting, said ratchet wheel for axial displacement relative to said shaft means to disengage said ratchet wheel from said pawl.

12. The safety belt retractor of claim 11 wherein said, mounting means includes an axially threaded extension at one end of said shaft means and wherein said ratchet wheel is threadably mounted on said extension.

13. The safety belt retractor of claim 12 wherein said pawl is pivotally mounted and has a hooked portion at one end for engaging any one of a plurality of teeth on said ratchet wheel.

14. The safety belt retractor of claim 13 including pawl control means frictionally coupled to said shaft means and operable for disengaging said pawl from said ratchet wheel when said belt is pulled from said shaft.

15. The safety belt retractor of claim 14 wherein said pawl control means includes a member frictionally mounted on said shaft means and a lever pivotally mounted on said member, said lever being provided for interposition between the other end of said pawl and a fixed point, whereby on common rotation of said member and said shaft means, in a belt retraction direction subsequent to the withdrawal of said belt said pawl is nudged into engagement with said ratchet wheel by said lever.

16. The safety belt retractor of claim 15 further comprising a casing and wherein said first and second biasing means are respective first and second spirally wound springs mounted in said casing, said first spring having one end connected to said shaft means and its other end connected to said casing, said second spring having one end connected to said ratchet wheel and its other end connected to said casing, said pawl control means being located between said first and second springs.

* * * * *